G. D. GALLAGHER.
HAND LAMP SWITCH.
APPLICATION FILED OCT. 25, 1921.
1,436,340.
Patented Nov. 21, 1922.
4 SHEETS—SHEET 1.
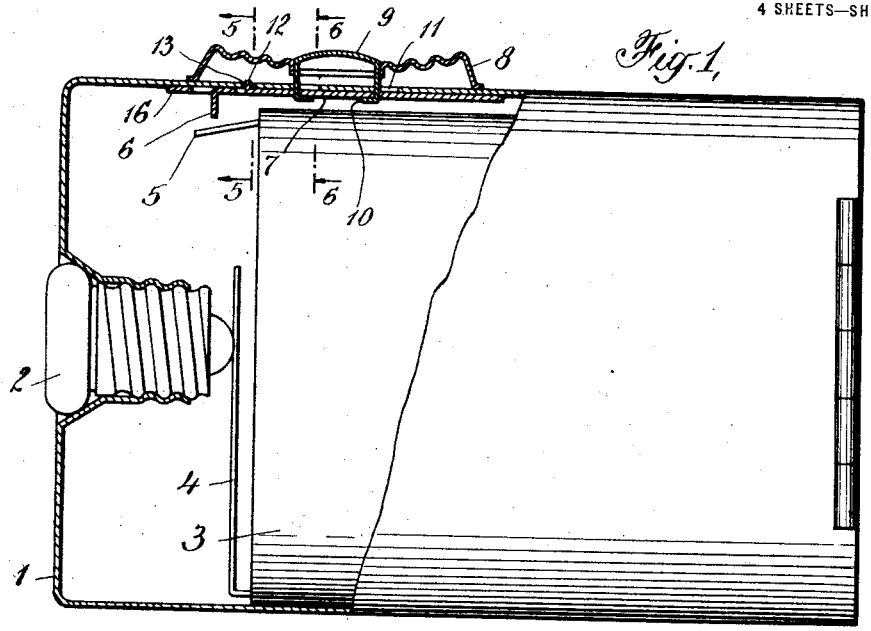
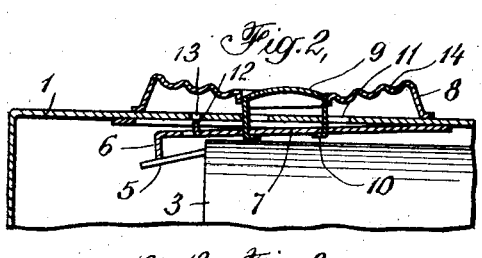
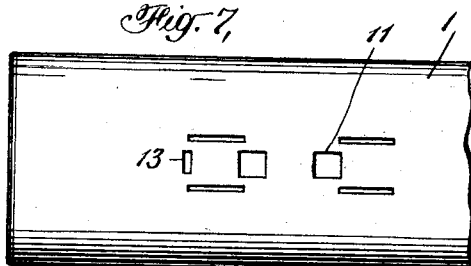
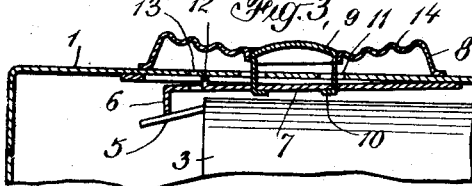
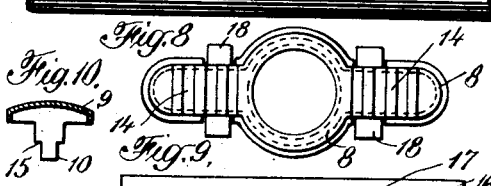
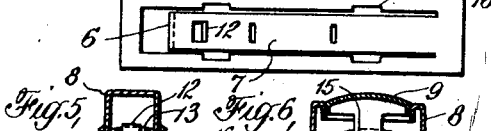
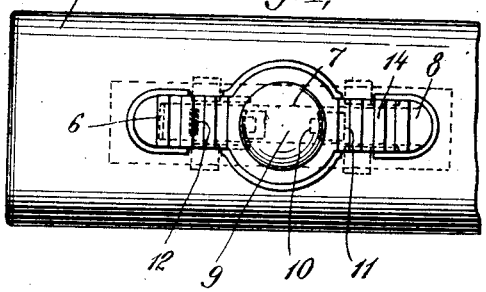
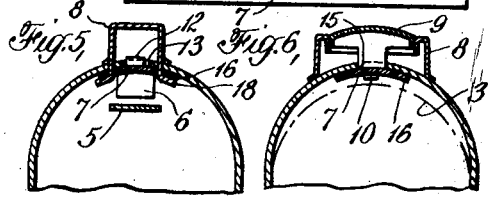
INVENTOR
George D. Gallagher
BY
Pennie Davis Marvin & Edmunds
ATTORNEYS

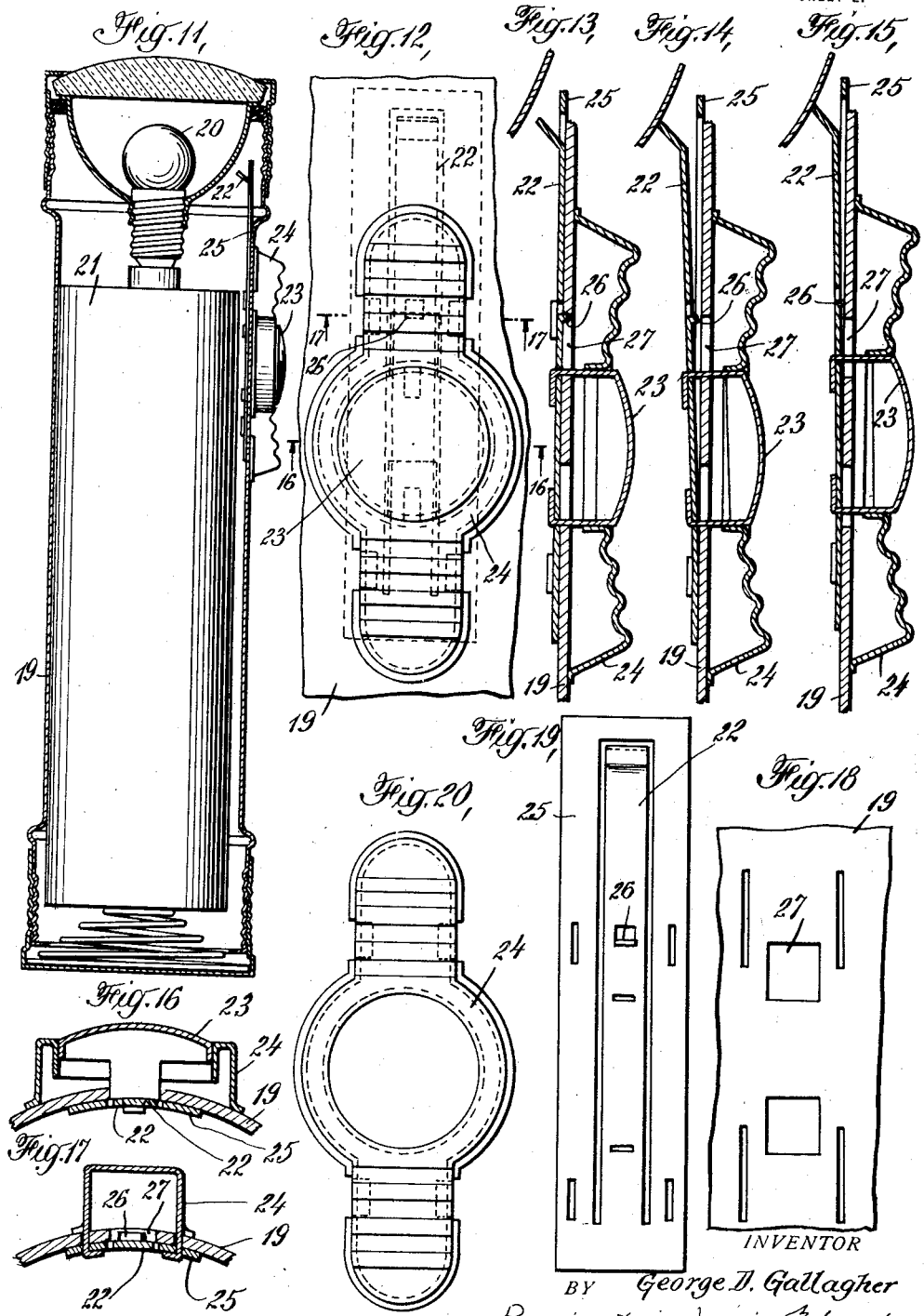

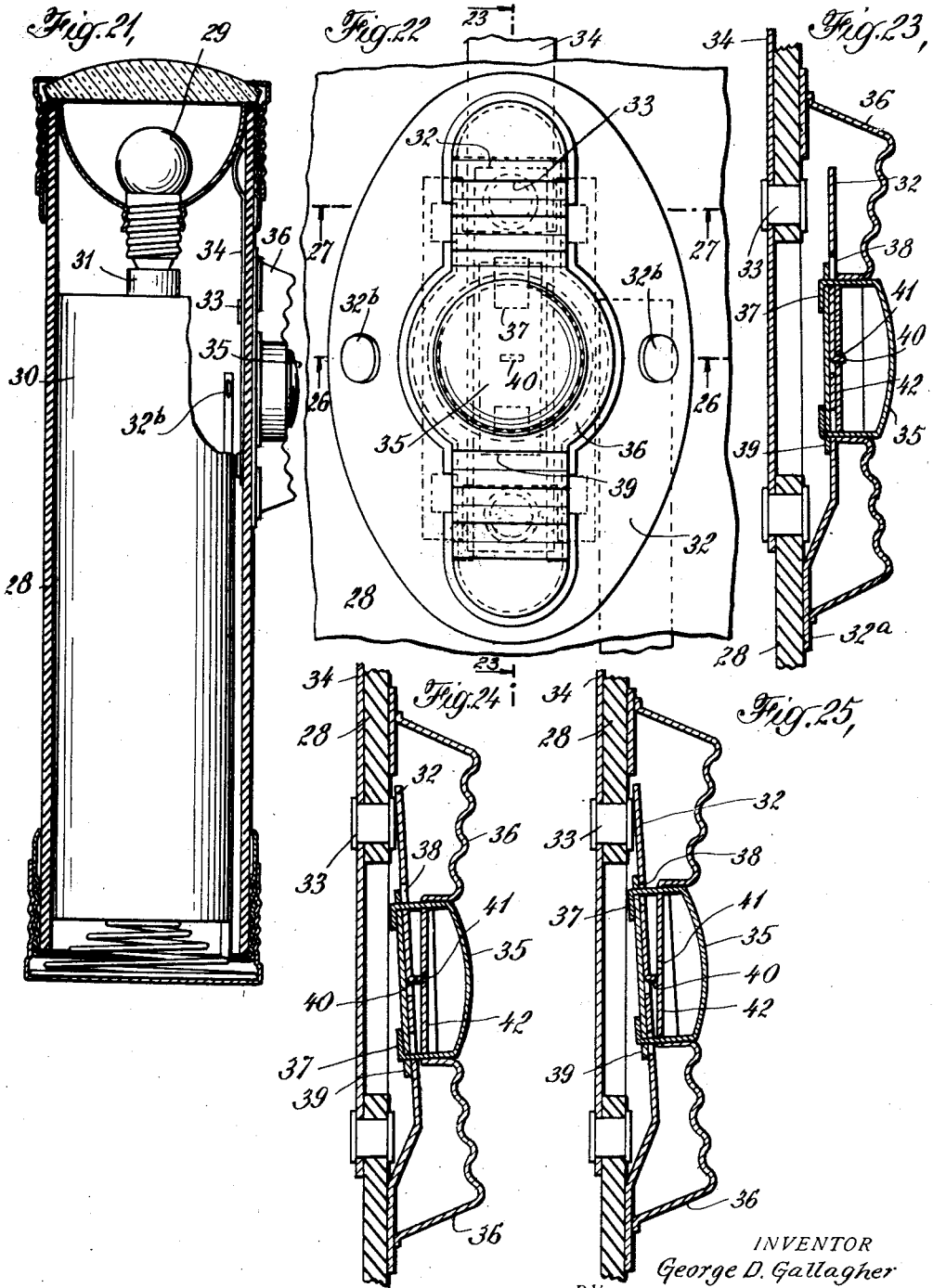

G. D. GALLAGHER.
HAND LAMP SWITCH.
APPLICATION FILED OCT. 25, 1921.
1,436,340.
Patented Nov. 21, 1922.
4 SHEETS—SHEET 4.
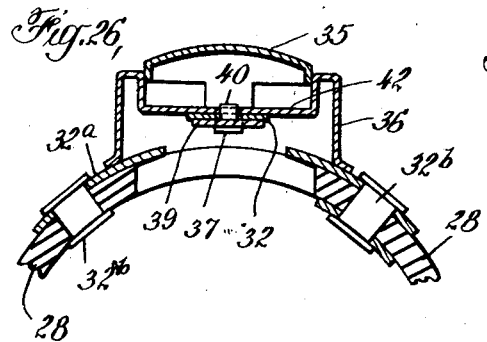
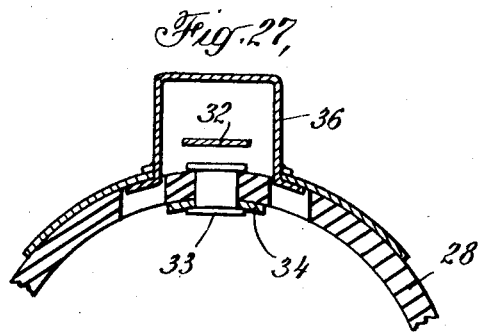
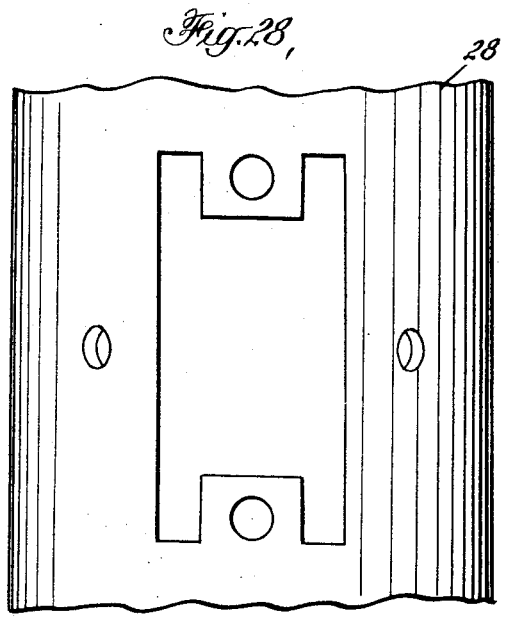
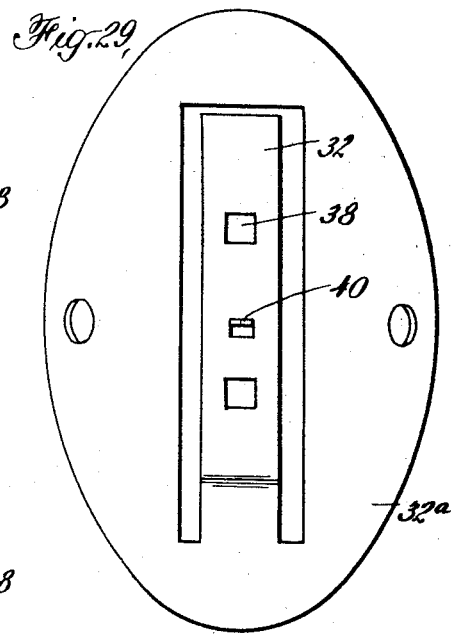
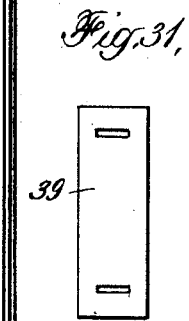
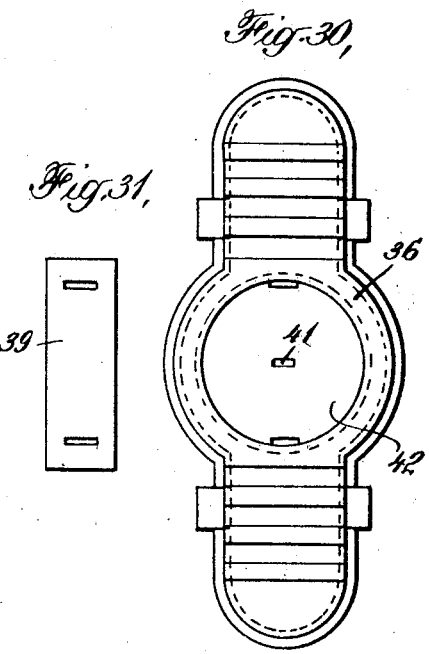
INVENTOR
George D. Gallagher
BY
ATTORNEYS

Patented Nov. 21, 1922.

1,436,340

UNITED STATES PATENT OFFICE.

GEORGE D. GALLAGHER, OF WASHINGTON, DISTRICT OF COLUMBIA, ASSIGNOR TO WINCHESTER REPEATING ARMS COMPANY, OF NEW HAVEN, CONNECTICUT, A CORPORATION OF CONNECTICUT.

HAND-LAMP SWITCH.

Application filed October 25, 1921. Serial No. 510,226.

*To all whom it may concern:*

Be it known that I, GEORGE D. GALLAGHER, a citizen of the United States, residing at Washington, District of Columbia, have invented certain new and useful Improvements in Hand-Lamp Switches; and I do hereby declare the following to be a full, clear, and exact description of the invention, such as will enable others skilled in the art to which it appertains to make and use the same.

In my prior applications Serial No. 387,277, Serial No. 387,278 and Serial No. 387,279, filed June 8, 1920, I show and describe switches, wherein certain of the switch parts are locked to prevent accidental burning of the light.

In the present invention, I provide a simplified construction, wherein the slidable housing is normally locked against sliding movement by the spring contact member, and wherein the button is normally free to operate the said contact member to close the circuit for momentary flashing of the lamp, as in signalling, and wherein a sliding movement of the housing after it has been released by the depression of the push button, will lock the push button in depressed position with the circuit closed. I also provide means in connection with the slidable housing for facilitating the movement of the same in either direction while the operator's thumb is engaged with the push button, and for protecting the button against accidental closing of the circuit, when in normal position. The several switch parts are so formed that they can be made by usual die and punch press operations and can be assembled easily and cheaply.

Figure 1 is a plan view of a hand lamp of the vest pocket type, provided with the improved switch, and with parts in section.

Figures 2 and 3 are sectional views of the switch showing the parts in flashing and continuous lighting positions, respectively, Figure 4 is a plan view of the switch, Figures 5 and 6 are sections on the lines 5—5 and 6—6, respectively, of Figure 1, Figure 7 is a view of the case wall at the switch, Figure 8 is a plan view of the housing detached, Figure 9 is a plan view of the spring contact member and the plate to which it is attached, Figure 10 is a diametrical section through the button, Figure 11 is a longitudinal section of another type of lamp, provided with the improved switch, Figure 12 is an enlarged plan view of the switch, Figures 13, 14 and 15 are longitudinal sections through the switch, showing the parts in different positions, Figures 16 and 17 are sections on the lines 16—16 and 17—17, respectively, of Figure 12, Figure 18 is a partial view of the case with the switch removed, Figure 19 is a plan view of the spring contact member and its supporting plate, Figure 20 is a plan view of the housing, Figure 21 is a view similar to Figure 11 showing another type of lamp, Figure 22 is a plan view of the switch, Figures 23, 24 and 25 are sections on the line 23—23 of Figure 22, showing the parts in different positions, Figures 26 and 27 are sections on the lines 26—26 and 27—27 of Figure 22, Figure 28 is a plan view of a part of the case with the switch removed.

Figure 29 is a plan view of the spring contact member and its supporting plate,

Figure 30 is a plan view of the housing,

Figure 31 is a similar view of the plate 39.

In the embodiment of the invention shown in Figures 1 to 6, the lamp is of usual construction, comprising the case 1 of metal having the lamp 2 connected therewith in the usual manner, and supplied with current from a battery 3, one of whose terminals 4 contacts with one of the terminals of the lamp. The other terminal 5 of the battery is designed to be engaged by a laterally extending lug 6 on a spring contact member 7, which is arranged to slide on the inner face of the case, and is connected to a housing 8 arranged to slide on the outer face of the case. The circuit from the terminal 5 is completed to the lamp through the metallic case. This housing has a central opening, in which is arranged the push button 9, and the push button moves with the housing and with the spring contact member, and is connected thereto, to move said member toward the battery, to cause the element 6 to contact with the terminal 5 to close the circuit. As shown in Figures 1, 2 and 3, the push button has lugs 10, which pass through slots 11 in the wall of the case 1, and through slots in the contact member, and are overset to hold the button to the contact member. Thus the contact member is slidably connected with the case. The contact member is also provided with a struck-up lug 12, which is adapted to engage a slot 13 in the wall of the case 1, when the contact member and the housing are in normal position and with the switch open. Thus the contract member, the housing and the push button are locked from sliding movement with respect to the case, while at the same time, the button is free to operate to close the circuit, by moving the contact member toward the terminal 5. The housing has roughened surfaces 14 at opposite sides of the push button, and inclined toward the push button, to facilitate the sliding movement of the housing while the thumb or finger is engaged with the push button. When the push button is depressed, and the lug 12 is moved out of engagement with the slot 13, by a rocking movement of the thumb or finger, one of the surfaces 14 may be engaged by said thumb or finger without releasing the button, and the housing may be moved longitudinally of the case. In order to lock the switch with the circuit closed, it is only necessary to slide the contact member toward the battery, the lug 12 moving against the inner surface of the case wall, and it will be evident that when the button is released, the lug 12 will hold the contact member in engagement with the terminal 5. This position, which is shown in Figure 3, provides for a continuous light. Referring to Figure 10, it will be seen that the lugs 10 are reduced at their extremities, to form shoulders 15 which engage the contact member, to space the body of the button away from said member. The contact member 7 is a tongue formed in a plate 16, and the plate has slots 17 at opposite slides of the tongue, for receiving lugs 18 on the housing, to connect the housing to the plate.

In the embodiment of the invention shown in Figures 11 to 20, the case 19 is of the cylindrical type, and of metal. The case has the usual lamp 20 and battery 21, and the battery has one terminal engaging directly with the lamp. The circuit is completed through the case and the reflector of the lamp, by means of a spring contact member 22. This member has an angular portion at the end adjacent to the reflector as shown, and the member is operated by a push button 23 mounted in a housing 24, similar to that shown in Figure 1. The button is connected with the contact member 22 in the same manner as the button 9 is connected to the contact member 7, and the said contact member is a tongue in a plate 25 which is connected to the housing in the same manner as in the construction of Figure 1. The housing and the contact member are locked in release position, by means of a struck-up lug 26 on the contact member, which is adapted to engage in one of the slots 27 in the case 19, through which the lugs which connect the button to the contact member pass, these slots corresponding to the slots 11 of Figure 7. The operation of the above described construction is similar to that of Figure 1. When the parts are in the position of Figure 13, the housing is locked against sliding movement with respect to the case, but the button is free to operate to close the circuit, by depressing the contact member 22. In this position, the circuit may be held closed, or it may be alternately closed and released, the closed position being shown in Figure 14. When it is desired to hold the circuit closed, the housing is moved toward the reflector, while the button is held depressed. The lug 26 now moves into contact with the inner face of the case wall, and when the button is released, the contact member is held in engagement with the reflector by the lug 26.

In the embodiment of the invention shown in Figures 21 to 31 inclusive, the case 28 is of the cylindrical type, and is of fiber or other insulating material. The said case carries the lamp 29, and the battery 30, one of whose terminals 31 contacts directly with the lamp. The circuit is completed by means of a spring contact member 32, which is arranged on the outer face of the case. This contact member is a tongue on a plate $32^a$ which is connected to the case 28 by rivets $32^b$. The said member is adapted to engage at its free end, a rivet 33 which secures a contact plate 34 on the inner face of the case to the case wall. The free end of this contact plate 34 engages the reflector of the lamp, as shown in Figure 21, and when the free end of the spring contact member 32 engages the rivet 33, the circuit of the lamp will be closed. The spring contact member 32 is operated by means of a push button 35 similar to the button 9, and mounted in a similar housing 36 slidable on the case wall. The lugs 37 of the button, which correspond to the lugs 10 of Figure 1, pass through slots 38 in the spring contact member, and through other slots in a plate 39 which is arranged on the underside of the spring contact member. Thus the button is slidably mounted on the spring contact member, so that the button may operate the said member while moving freely longitudinally thereof, within limits prescribed by the length of the slots 38. The several positions of the parts in the operation of this embodiment of the invention are shown in Figures 23 to 25, Figure 23, showing the locking position. In the present construction the spring contact member 32 has a struck-up lug 40 which engages a slot 41 in the housing to hold the housing in inoperative position. Referring to Figures 23 to 25, it will be seen that the housing 36 differs slightly from that shown in Figure 1, in that the central opening for the button is replaced by a cup like depression indicated at 42. The lugs 37 pass through slots in the bottom of the depression, then through the slots 38, and through the slots of the plate 39. When the parts are in the position of Figure 23, the housing is locked from sliding movement, but the button is free to operate the contact member, as shown in Figure 24. To lock the circuit closed, the housing, with the parts in the position of Figure 4 is moved longitudinally of the case, and the lug 40 engages beneath the cup-like depression 42, and locks the parts in the position of Figure 25. In each construction, when the parts are in normal position, the housing is locked against sliding movement, but the button is free to operate. Without removing the thumb or finger from the button, the user may shift the housing, to lock the button with the circuit closed.

I claim:

1. In a switch for hand lamps, a push button, and a slidable housing carrying the button, a spring contact member moved by the button to circuit closing position, and means controlled by the member when in normal position for locking the housing from sliding movement and released by the button when closing the circuit.

2. In a switch for hand lamps, a push button, and a slidable housing carrying the button, a spring contact member moved by the button to circuit closing position, means controlled by the member when in normal position for locking the housing from sliding movement and released by the button when closing the circuit, and means controlled by the sliding movement of the housing for holding said contact member in closed position.

3. In a flash lamp, a spring contact member for closing the circuit normally in inoperative position, a push button for operating the member, a slidable housing in which the button is mounted, and means controlled by the contact member when in inoperative position for locking the slide from movement and released by the depression of the button to close the circuit.

4. In a switch for hand lamps, a longitudinally slidable housing, a stationary contact spring therein, a push button for the operation of the said spring mounted in the said housing and slidable therewith, and means controlled by the spring contact member for locking the button in depressed position when the housing is in one position.

5. In a switch for hand lamps, a longitudinally slidable housing, a stationary spring contact therein having an aperture, a push-button for the operation of the said spring mounted in the said housing slidable therewith and having a projecting lug, the said lug co-acting with the said aperture in one position of the said housing to prevent motion of the same except after the said button is depressed.

6. In a hand lamp the combination with the casing thereof, of a longitudinally slidable housing mounted thereon, a contact strip rigidly attached to the said casing, a stationary contact spring mounted on the said casing in the said housing and connected with the said strip, a push-button mounted in the said housing for the operation of the said spring, and means whereby the said housing in one position thereof is locked by the spring against sliding except when the said push-button is depressed.

In testimony whereof I affix my signature.

GEORGE D. GALLAGHER.